United States Patent Office 3,460,994
Patented Aug. 12, 1969

3,460,994
METHOD OF MANUFACTURING A CATALYTIC OXYGEN ELECTRODE FOR ALKALINE FUEL CELLS
Dexter William Smith, Birmingham, England, assignor to Joseph Lucas (Industries), Limited, Birmingham, England
No Drawing. Filed Nov. 18, 1965, Ser. No. 508,582
Int. Cl. H01m 27/10
U.S. Cl. 136—120   3 Claims

ABSTRACT OF THE DISCLOSURE

To produce a catalytic oxygen electrode for alkaline fuel cells silver powder is mixed with a salt of a metal which when alloyed with the silver produces a catalyst. The mixture is prepared into a plate, and the plate is heated to decompose the metal salt to form the free metal, and to alloy that metal with the silver powder to form a catalytic oxygen electrode.

---

A conventional silver oxygen electrode for an alkaline fuel cell can be rendered more efficient by the addition thereto of catalysts which increase the number of free electrons available, suitable catalysts being alloys of silver with cadmium, indium, tin or antimony. However, it is difficult to mix such alloys directly with silver and then produce a porous structure because it is difficult to produce the alloys in powder form.

The object of this invention is to provide a convenient method of manufacturing an oxygen electrode which can be used in an alkaline fuel cell, but can also be used in a hybrid fuel cell. The hybrid fuel cell can be regarded as a fuel cell in which the fuel electrode is replaced by a battery plate, or as an alkaline battery in which one of the battery plates is replaced by an oxygen electrode.

A method according to the invention comprises mixing with silver the salt of a metal which when alloyed with silver produces a catalyst, the salt being such that it will decompose under heat to give the metal, preparing a plate from the mixture, and heating the plate to decompose the salt.

In one example 50% by volume of fine silver powder is mixed with 50% by volume of cadmium formate, and the mixture is ground to pass through a —350 B.S. mesh. The proportions are chosen so that the finished electrode will have a porosity of 25 to 30%. The mixture is then pressed at 10 to 15 t.s.i. to form a plate.

The plate is heated to 300° C. in a stream of dry hydrogen and is maintained at this temperature for 1 to 3 minutes. During this stage, the cadmium formate decomposes to leave a porous silver-cadmium electrode. Finally, the plate is sintered by heating it from 300° C. to 640° C. rapidly in a still hydrogen atmosphere, maintained at this temperature for 25 to 35 minutes and then cooled.

A similar method can be utilized with other decomposable salts of cadmium and of indium, tin and antimony and with mixtures of salts of the same or difference metals.

The electrode can be used in conjunction with a hydrogen electrode in an alkaline fuel cell, or in conjunction with a battery plate in a hybrid fuel cell, of which the best known example is the zinc-air battery which utilizes a zinc battery plate and an oxygen electrode.

Having thus described my invention what I claim as new and desire to secure by Letters Patent is:

1. A method of manufacturing a catalytic oxygen electrode for alkaline fuel cells comprising mixing silver powder with a metal salt, which salt is capable of decomposing to give said metal and which metal is capable of alloying with silver to form a catalyst; preparing a plate from said mixture; and during heating of said plate decomposing said metal salt to give said metal and alloying said metal with said silver powder to form a catalytic alloy, and thereby forming a catalytic oxygen electrode.

2. A method as claimed in claim 1, wherein said metal is chosen from a group consisting essentially of cadmium, indium, tin or antimony.

3. A method as claimed in claim 1, wherein said plate is first heated in a stream of non-oxidizing gas to decompose said salt; and a further second step of heating is conducted by sintering said plate in a non-oxidizing gas.

References Cited

UNITED STATES PATENTS

| | | | |
|---|---|---|---|
| 2,880,257 | 3/1959 | Murphy et al. | 136—29 |
| 2,945,078 | 7/1960 | Chapman et al | 136—20 |
| 3,104,990 | 9/1963 | Solomon et al. | 136—20 |
| 3,212,934 | 10/1965 | Lander et al. | 136—20 |
| 1,988,861 | 1/1935 | Thorausch et al. | 75—211 |
| 3,338,751 | 8/1967 | Barber | 136—29 |

ALLEN B. CURTIS, Primary Examiner
A. SKAPARS, Assistant Examiner

U.S. Cl. X.R.
75—173, 211